(12) United States Patent
Chamaret et al.

(10) Patent No.: US 8,437,543 B2
(45) Date of Patent: May 7, 2013

(54) METHOD AND DEVICE OF DETERMINING A SALIENCY MAP FOR AN IMAGE

(75) Inventors: Christel Chamaret, Chantepie (FR); Fabrice Urban, Thorigné-Fouillard (FR); Brice Follet, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 45 days.

(21) Appl. No.: 13/199,303

(22) Filed: Aug. 25, 2011

(65) Prior Publication Data

US 2013/0028511 A1    Jan. 31, 2013

(30) Foreign Application Priority Data

Sep. 16, 2010  (EP) ..................... 10305989

(51) Int. Cl.
    *G06K 9/00*    (2006.01)
(52) U.S. Cl.
    USPC ............ 382/165; 382/162; 382/167; 382/274
(58) Field of Classification Search .................. 382/162, 382/165, 167, 274, 232, 240; 348/453; 345/589, 345/591, 593, 597, 605
    See application file for complete search history.

(56) References Cited

U.S. PATENT DOCUMENTS

| | | | |
|---|---|---|---|
| 7,116,836 B2* | 10/2006 | Rising, III | 382/254 |
| 7,436,981 B2* | 10/2008 | Pace | 382/103 |
| 8,165,407 B1* | 4/2012 | Khosla et al. | 382/224 |
| 8,243,068 B2* | 8/2012 | Varshney et al. | 345/420 |

FOREIGN PATENT DOCUMENTS

WO    WO2011008236    1/2011

OTHER PUBLICATIONS

Barath, Anil et al., "Next Generation Artificial Vision Systems", Artech House, Jan. 1, 2008, p. 28.
Frisby, John P., "Chapter 6—Seeing and the Retina", Seeing. The Computational Approach to Biological Vision, Second Edition, MIT, Jan. 1, 2010, pp. 138-147.
Itti, L. et al., "A Model of Saliency-Based Visual Attention for Rapid Scene Analysis", IEEE Transactions on Pattern and Machine Intelligence, Los Alamitos, California, vol. 20, No. 11, Nov. 1, 1998, pp. 1254-1255.
Itti, Laurent, "Models of Bottom-up Attention and Saliency", Nuerobiology of Attention, Elsevier, Jan. 1, 2005, pp. 576-582.
Le Meur, Olivier, "Attention Selective en Visualisation d'images fixes et animees affichees sur ecran: modeles et evaluation de performances—applications", Doctoral Thesis, University of Nantes Oct. 24, 2005, Part 1.

(Continued)

*Primary Examiner* — Ali Bayat
(74) *Attorney, Agent, or Firm* — Robert D. Shedd; Patricia A. Verlangieri

(57) ABSTRACT

The invention proposes a method and a device of determining a saliency map for an image.
The proposed method uses a processing device for executing the steps of: selecting one of at least two different predetermined weight sets each associated with the predetermined scene category by determining to which of the predetermined scene categories a scene depicted in the image belongs, each predetermined weight sets comprising weights for color dependent subbands, splitting the image into color dependent frequency subbands and orientation subbands by splitting the image into color components and applying wavelet transformation to each color component, determining early feature maps for the subbands by extracting visual features from the wavelet transforms by a center-surround mechanism based on a Difference of Gaussian, weighting the early feature maps using the selected weight set and fusing the weighted feature maps.

4 Claims, 5 Drawing Sheets

OTHER PUBLICATIONS

Le Meur, Olivier, "Attention Selective en Visualisation d'images fixes et animees affichees sur ecran: modeles et evaluation de performances—applications", Doctoral Thesis, University of Nantes Oct. 24, 2005, Part 2.

Le Meur, Olivier, "Attention Selective en Visualisation d'images fixes et animees affichees sur ecran: modeles et evaluation de performances—applications", Doctoral Thesis, University of Nantes Oct. 24, 2005, Part 3.

Le Meur, Olivier et al., "A Coherent Computational Approach to Model Bottom-up Visual Attention", IEEE Transactions on Pattern Analysis and Machine Intelligence, vol. 28., No. 5, May 1, 2006, pp. 802-817.

Palmer, Stephen E., "Chapter 4, Processing Image Structure", Vision Science. Photons to Phenomenology, MIT, Jan. 1, 1999, pp. 145-197.

Navalpakkam et al., "An Integrated Model of Top-Down and Bottom-Up Attention for Optimizing Detection Speed", Conference on Computer Vision and Pattern Recognition, 2006 IEEE Computer Society, vol. 2, New York, New York, Jun. 17, 2006, pp. 2049-2056.

Barath et al., "Next Generation Artificial Vision Systems", Artech House, Jan. 1, 2008, pp. 105, 120-121.

Torralba, "Contextual Influences on Saliency", In: Laurent Itti et al: "Neurobiology of Attention", Jan. 1, 2005, pp. 586-592.

Navalpakkam et al., "Attention and Scene Understanding", In: Laurent Itti et al: Neurobiology of Attention, Jan. 1, 2005, pp. 197-206.

Urban et al., "Medium Spatial Frequencies, a Strong Predictor of Salience", Cognitive Computation, Nov. 23, 2011, pp. 37-47.

Divakaran, "Multimedia Content Analysis", Jan. 1, 2009, pp. 186-187.

EP Search Report dated Apr. 21, 2011.

\* cited by examiner

METHOD AND DEVICE OF DETERMINING A SALIENCY MAP FOR AN IMAGE

This application claims the benefit, under 35 U.S.C. §119 of EP Patent Application 10305989.5, filed 16 Sep. 2010.

FIELD OF THE INVENTION

The invention is made in the field of saliency map determination for images.

BACKGROUND OF THE INVENTION

Saliency maps reflect that the visual attention which subjects pay for image content varies in dependency on the content depicted. Visual attention is modelled in top-down models and in bottom up models.

Top-down models are related to voluntary attention resulting from a cognitive task, such as object search, location recognition or face recognition. Bottom up models are related to involuntary attention guided only by visually relevant or stimulating areas of the image.

C. Koch and S. Ullman: "Shifts in selection in Visual Attention: Towards the Underlying Neural Circuitry", Human Neurobiology, vol. 4, No. 4, p. 219-227, 1985, describe a model were early feature are extracted from visual input into several separate parallel channels. After this extraction and a particular treatment, a feature map is obtained for each channel. Next, the saliency map is build by fusing all these maps.

L. Itti and C. Koch: "Feature combination strategies for saliency-based visual attention systems", JOURNAL OF ELECTRONIC IMAGING, 10 (1), p. 161-169, January 2001, study the problem of combining feature maps into a unique saliency map. Four combination strategies are compared: (1) Simple normalized summation, (2) linear combination with learned weights, (3) global nonlinear normalization followed by summation, and (4) local nonlinear competition between salient locations followed by summation.

O. Le Meur, et al.: "A Coherent Computational Approach to Model Bottom-up Visual Attention", IEEE Trans. On Pattern analysis and Machine intelligence, Vol 28, No. 5, p. 802-817, May 2006, propose extraction of early feature maps by a perceptual channel decomposition of each of three perceptual components by splitting the 2D spatial frequency domain both in spatial radial frequency and in orientation.

A. Torralba et al.: "Top-down control of visual attention in object detection" ICIP 2006 determines saliency maps for object search and uses scene categories for spatially tuning the saliency maps by selecting a spatial stripe and reinforcing saliency in this stripe.

SUMMARY OF THE INVENTION

The invention introduces scene category dependent feature map weighting into bottom-up approaches.

The invention proposes a method of determining a saliency map for an image according to claim 1 and a device for determining a saliency map for an image according to claim 3.

The proposed method comprises using a processing device for executing the steps of: determining to which of at least two predetermined scene categories a scene depicted in the image belongs wherein each of the at least two predetermined scene categories is associated with a different predetermined set of weights, each predetermined set of weights comprising weights for colour dependent subbands, selecting the weight set associated with the determined scene category, splitting the image into colour dependent frequency subbands and orientation subbands by splitting the image into colour components and applying wavelet transformation to each colour component, determining early feature maps for the subbands by extracting visual features from the wavelet transforms by a center-surround mechanism based on a Difference of Gaussian, using the selected weight set for weighting the early feature maps and fusing the weighted feature maps.

The application of predetermined scene category dependent weight sets of which each comprises one weight per colour dependent subband improves the prediction and reliability of the bottom-up visual attention model.

The features of further advantageous embodiments are specified in the dependent claims.

BRIEF DESCRIPTION OF THE DRAWINGS

Exemplary embodiments of the invention are illustrated in the drawings and are explained in more detail in the following description. The exemplary embodiments are explained only for elucidating the invention, but not limiting the invention's disclosure, scope or spirit defined in the claims.

In the figures.

DETAILED DESCRIPTION OF THE INVENTION

The invention may be realized on any electronic device comprising a processing device correspondingly adapted. For instance, the invention may be realized in a television, a mobile phone, a personal computer, a digital still camera, a digital video camera or a car entertainment system.

Saliency maps can be used in encoding, for instance in that more salient image regions are encoded with higher bit depth than less salient image regions. Or, in a scalable video encoding framework, the more salient image regions are encoded in a base layer while the less salient image regions are encoded in enhancement layers. Another field of application for saliency maps is the automated measurement of quality of experience. Such automated measurement is of advantage, for instance, in video provision services with quality dependent service fees, in evaluation of transmission channels or in evaluation of codecs.

Figure 5:
FIG. 5 depicts examples of stimuli for the STREET category and the OPENCOUNTRY category and its ocular fixation localization.

Based on some eye-tracking experiments, the inventors identified some typical behavior of observers for different scene categories, e.g. high frequencies have a major role for the prediction of attention regarding a street category and the vertical orientation is dominant in the attention deployment of a street category. FIG. 5 depicts examples of stimuli for the STREET category and the OPENCOUNTRY category and its ocular fixation localization.

These experiments provided the inventors with a frequency, orientation and colour behavior per scene category which are matched in the following embodiments of visual attention model architectures. At least one embodiment is based on a wavelet transform which splits the original signal into frequency and orientation sub-bands (such as described later). This transform is applied on each colour component independently leading to a final merge of sub-bands and of color components at the end of the process.

The merge or fusion of sub-bands is dependent on a scene category determined for the current image in order to improve the prediction of the computed saliency maps.

Figure 1:
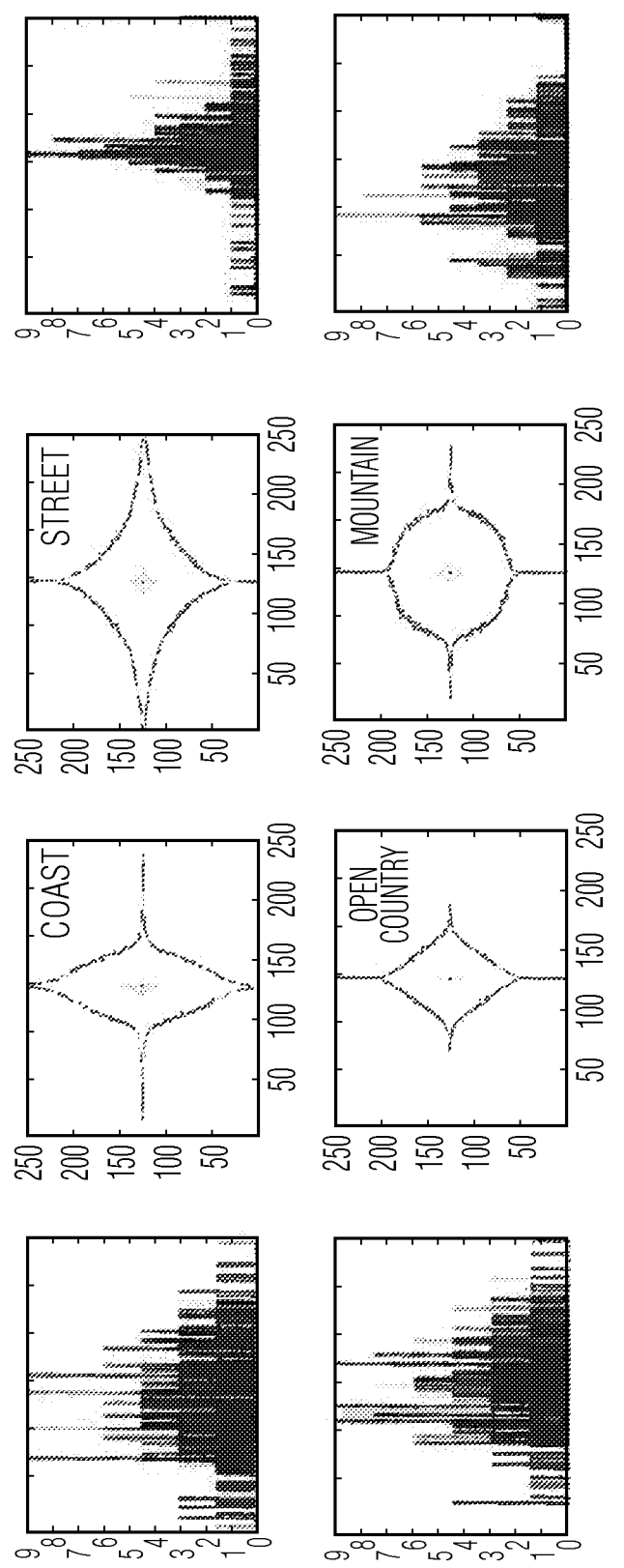
FIG. 1 depicts representation of the mean spectrum of the 4 exemplary reference scene categories with associated distribution histograms.

In an embodiment, four different semantic categories have been characterized by its frequency signal particularities: COAST, MOUNTAIN, STREET and OPENCOUNTRY. These categories are interesting for obtaining typical stimuli because their Fourier spectrums are significantly different as exemplarily illustrated by FIG. 1 which depicts representation of the mean spectrum of four reference scene categories described by Torralba and used with the distribution histogram associated. Distribution corresponds to the distance d from the mean spectrum normalized by the standard deviation of the category ($d(s)=\Sigma[s(n,m)-AS(n,m)]/(n*m)$; AS=Average Spectra). This figure shows that spectral profiles are very distinct from one category to another, which reveals the invariant global layouts of the categories. Indeed, COAST presents a horizontally stretched diamond spectrum showing the horizontal fundament of the gist, OPENCOUNTRY provides a more proportioned diamond shaped spectrum which suggests more equality (in mean) for the proportion between horizontal and vertical aspects. MOUNTAIN spectrum is isotropic and underlines random aspect of Mountain shapes. STREET spectrum is very stretched especially in horizontal axis and in vertical axis what reveals rectilinear elements characterizing scenes with artificial surroundings. Further scene categories are possible.

Figure 2:
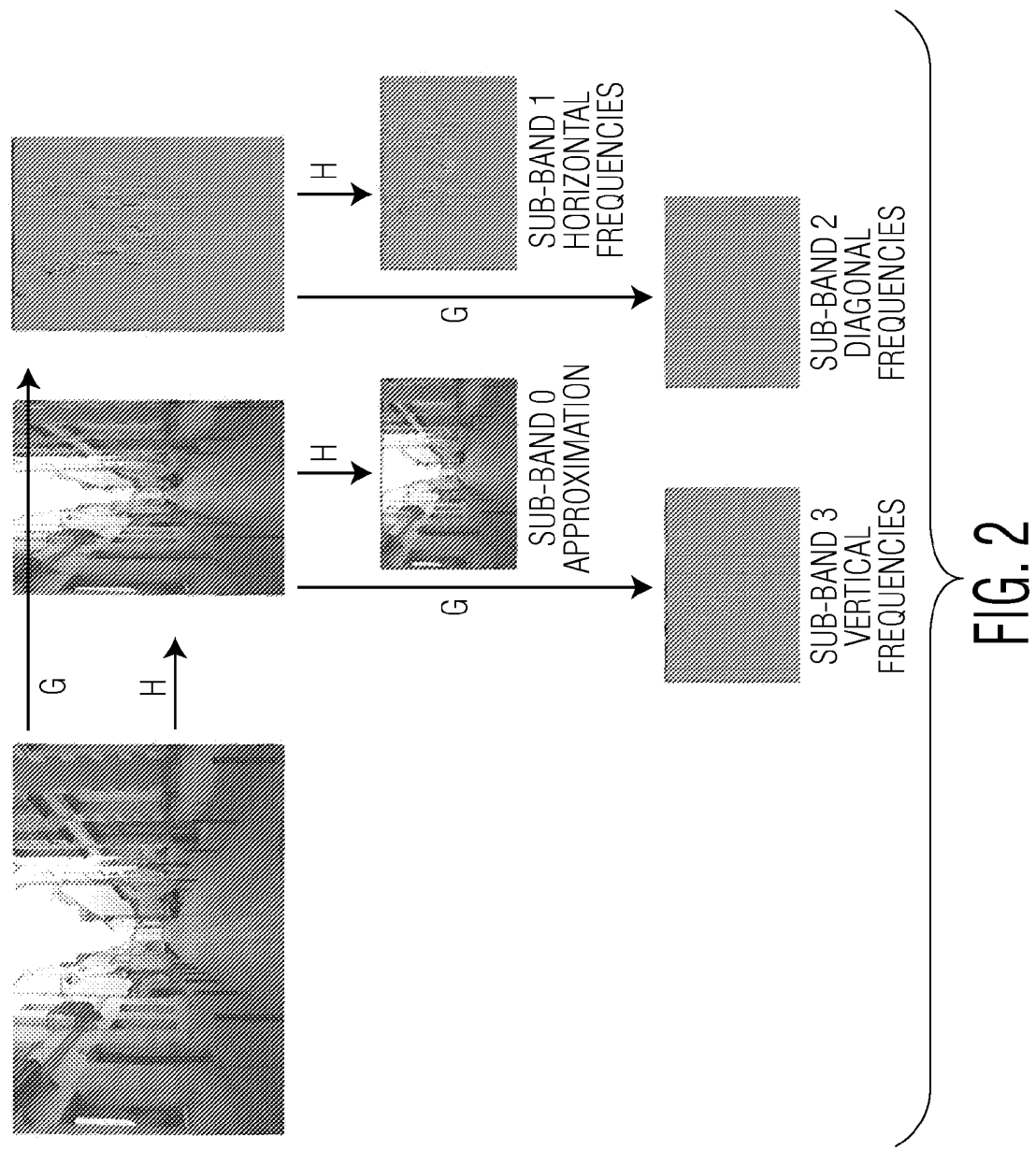
FIG. 2 depicts an exemplary one-level wavelet decomposition.
Figure 3:
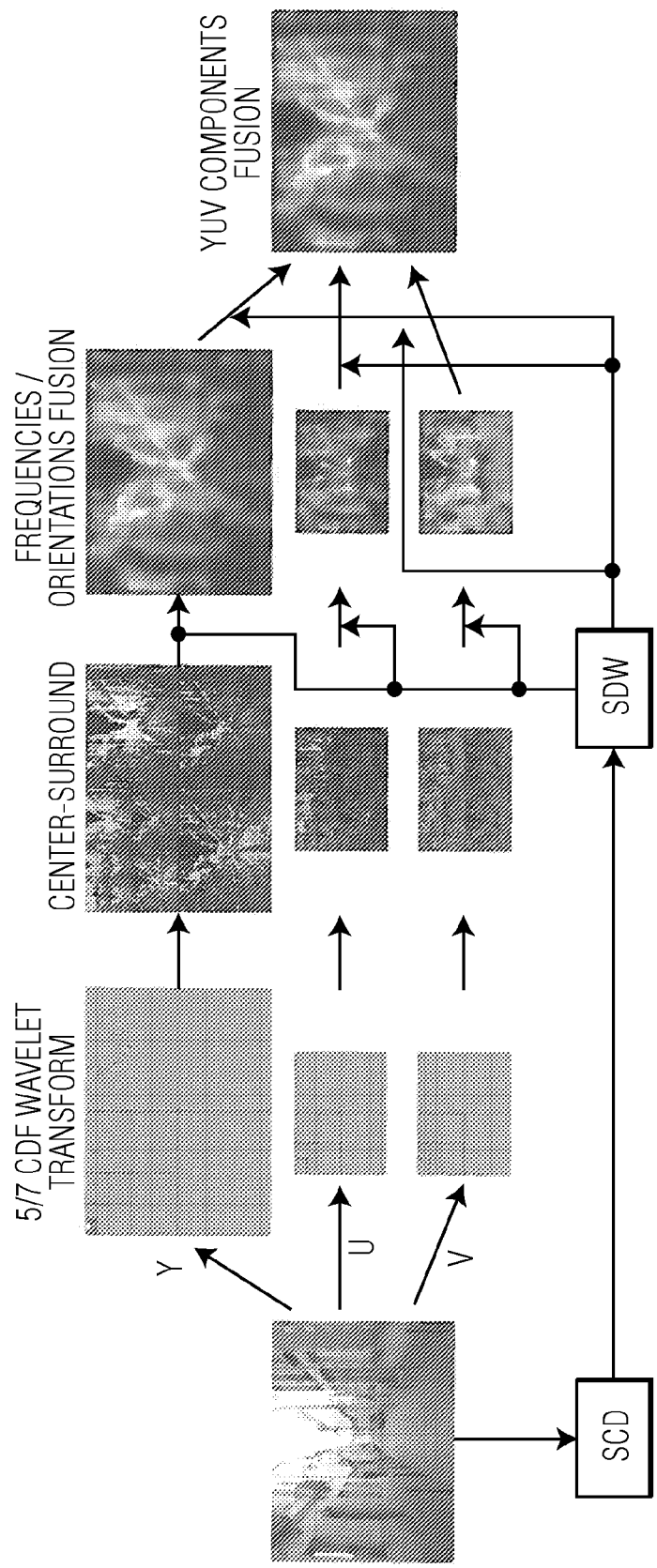
FIG. 3 depicts an overview over an exemplary visual attention model.
Figure 4:
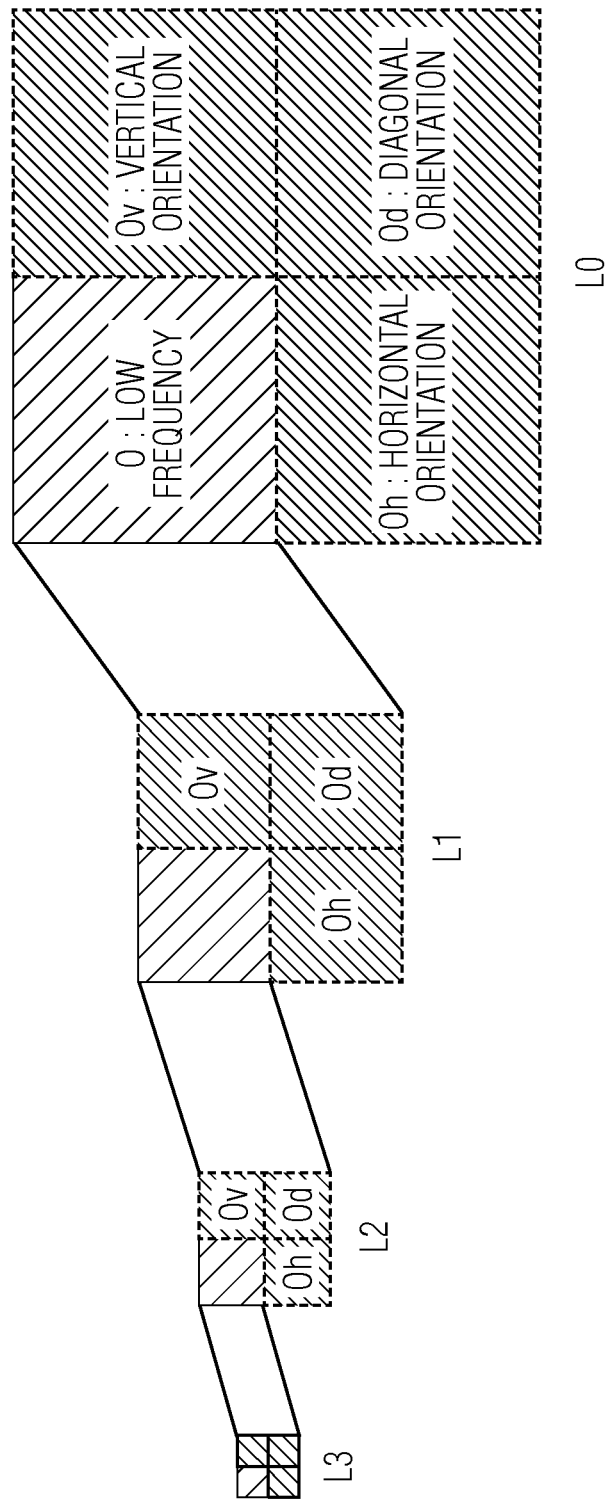
FIG. 4 depicts exemplary levels of wavelet decomposition.

In an embodiment, the visual signal is hierarchically decomposed. This is exemplarily depicted in FIGS. 2, 3 and 4. A first step consists in separating the image signal into frequency level and orientation channels. The YUV color space separates achromatic (Y) and chromatic (U and V) perceptual signals. In an embodiment, the chromatic components have half the spatial resolution of the achromatic component. A separation of frequency and orientation ranges is performed, for instance through a wavelet transform for its computational efficiency. The wavelet transform separates frequencies with a succession of low-pass (H) and high-pass (G) filters followed by critical sub-sampling as exemplarily depicted for one level wavelet decomposition in FIG. 2. One level wavelet transform results in four sub-bands: sub-band0 is the low-passed image approximation that is wavelet transformed to get next decomposition level; sub-band1 contains horizontal frequencies which corresponds to vertical orientation lines in the image; sub-band2 contains both diagonals; and sub-band3 contains vertical frequencies and corresponds to horizontal orientation lines in the image.

The number of wavelet levels can be fixed in advance, e.g. two or three, or it can be determined so that the smallest level has frequencies of 1 cycle per degree of visual angle. In an embodiment exemplarily depicted in FIG. 4, the input image is thus decomposed into four levels L0, L1, L2, L3, each level comprising three orientation sub-bands Ov for vertical orientation, Od for diagonal orientation, and Oh for horizontal orientation. The last level also contains an approximation image, e.g. a low-resolution version of the image. Table 1 presents the frequency ranges in each level.

TABLE 1

| | Level number | | | |
|---|---|---|---|---|
| | 0 | 1 | 2 | 3 |
| Frequency range (cycles per degree) | 10.7-5.3 | 5.3-2.7 | 2.7-1.3 | 1.3-0.7 (0.7-0 for sub-band0) |

In a second step, early visual features are extracted from the wavelet transformed signal, for instance by a center-surround mechanism based on a Difference of Gaussian (DoG). For each location, the center-surround is computed as the absolute difference between the center pixel and the average of absolute value of the surroundings pixels, e.g. in a five by five pixels square. Afterwards, in order to have the same spatial spreading of each computed value, center-surround results are averaged on a neighbourhood, for instance a circular neighborhood of one visual degree of diameter, e.g. one pixel at level L3 up to eleven pixels at level L0.

Finally, weighted fusion of the early feature maps weighted by scene category dependent weights is applied. For each predetermined scene category there is a set of weights. In an embodiment exemplarily depicted in FIG. 3, scene category determination SCD and determination of scene dependent weights SDW takes place and three fusions are successively applied: orientations fusion, levels fusion and color channels fusion. In this embodiment, different weights are applied in at least one of the three fusion steps, examples for such different weights being given below in tables 2, 3 and 4. Fusion operation can be, for instance, weighted sums of the per-pixel center-surround values. In an embodiment, orientation and level uses weighted sums of the per-pixel center-surround values, with level fusion comprising up-sampling between levels. Color channel fusion operation keeps the maximum saliency value between Y, U, and V pixels after normalizing with an experimental maximum value taking into account the difference of amplitude between the three channels (Y: 5000, U&V: 1000). The output map can be finally normalized on 8 bits integer grayscale image (between 0 and 255).

Table 2 lists examples of the different weights which can be applied for orientation fusion in dependency on the scene category (OPENCOUNTRY, COAST, MOUNTAIN and STREET).

TABLE 2

| | All Levels relative energy/NSS | | | Weighting factor | | |
|---|---|---|---|---|---|---|
| | Ov | Od | Oh | Ov | Od | Oh |
| OPENCOUNTRY | 1.3 | 1.8 | 3.8 | 0.4 | 0.5 | 1.0 |
| COAST | 1.5 | 1.8 | 5.5 | 0.3 | 0.3 | 1.0 |
| MOUNTAIN | 3.2 | 3.7 | 5.2 | 0.6 | 0.7 | 1.0 |
| STREET | 3.8 | 2.3 | 2.9 | 1.0 | 0.6 | 0.8 |

Table 3 lists examples of the different weights which can be applied for level fusion in dependency on the scene category.

TABLE 3

| | All Orientations relative energy/NSS | | | | Weighting factor | | | |
|---|---|---|---|---|---|---|---|---|
| | L0 | L1 | L2 | L3 | L0 | L1 | L2 | L3 |
| OPENCOUNTRY | 0.1 | 0.8 | 2.0 | 2.4 | 0.0 | 0.3 | 0.8 | 1.0 |
| COAST | 0.1 | 0.6 | 2.3 | 2.9 | 0.0 | 0.2 | 0.8 | 1.0 |

TABLE 3-continued

| | All Orientations relative energy/NSS | | | | Weighting factor | | | |
|---|---|---|---|---|---|---|---|---|
| | L0 | L1 | L2 | L3 | L0 | L1 | L2 | L3 |
| MOUNTAIN | 0.1 | 0.8 | 3.1 | 4.3 | 0.0 | 0.2 | 0.7 | 1.0 |
| STREET | 0.1 | 0.7 | 2.3 | 3.4 | 0.0 | 0.2 | 0.7 | 1.0 |

Table 4 lists examples of the different weights which can be applied for colour fusion in dependency on the scene category (OPENCOUNTRY, COAST, MOUNTAIN and STREET).

TABLE 4

| | All Orientations and level relative energy/NSS | | | Weighting factor | | |
|---|---|---|---|---|---|---|
| | Y | U | V | Y | U | V |
| OPENCOUNTRY | 0.5 | 0.5 | 0.6 | 0.8 | 0.8 | 1.0 |
| COAST | 0.6 | 0.6 | 0.6 | 1.0 | 1.0 | 1.0 |
| MOUNTAIN | 0.5 | 0.6 | 0.7 | 0.7 | 0.9 | 1.0 |
| STREET | 0.5 | 0.4 | 0.4 | 1.0 | 0.8 | 0.8 |

The evaluation of proposed weights to be used for the merging process are based on the comparison of saliency maps which are either computed from the computational visual attention model or computed from the eye fixations recorded for all observers (FIG. 5).

Several metrics can be used to assess the degree of similarity between a ground truth and a prediction. In an embodiment, the NSS metric (NSS stands for Normalized Scanpath Salience) has been chosen for its simplicity and its relevancy. The NSS is relevant because it allows computing the value of salience. Its particularity is to average per scanpath the saliency at each fixation point locus and so, to provide a similarity metric based on the relevance of each entire scanpath independently of its size. Another advantage is to bring a signed metric centered on zero. It means that a positive value corresponds to similarity, a negative value corresponds to dissimilarity, and a zero value amounts to hazard.

What is claimed is:

1. A method of determining a saliency map for an image, said method comprising using a processing device for executing the steps of determining to which of at least two predetermined scene categories a scene depicted in the image belongs wherein each of the at least two predetermined scene categories is associated with a different predetermined set of weights, each predetermined set of weights comprising weights for colour dependent subbands, selecting the weight set associated with the determined scene category, splitting the image into colour dependent frequency subbands and orientation subbands by splitting the image into colour components and applying wavelet transformation to each colour component, determining early feature maps for the subbands by extracting visual features from the wavelet transforms by a center-surround mechanism based on a Difference of Gaussian, using the selected weight set for weighting the early feature maps and fusing the weighted feature maps.

2. The method of claim 1, wherein the early feature maps are successively fused, first by orientation, then by level and finally by colour component.

3. A device of determining a saliency map for an image, said device comprising means for selecting one of at least two different predetermined weight sets each associated with the predetermined scene category by determining to which of the predetermined scene categories a scene depicted in the image belongs, each predetermined weight sets comprising weights for colour dependent subbands, means for splitting the image into colour dependent frequency subbands and orientation subbands by splitting the image into colour components and applying wavelet transformation to each colour component, means for determining early feature maps for the subbands by extracting visual features from the wavelet transforms by a center-surround mechanism based on a Difference of Gaussian, means for weighting the early feature maps using the selected weight set and means for fusing the weighted feature maps.

4. The device of claim 3, wherein the early feature maps are successively fused, first by orientation, then by level and finally by colour component.

* * * * *